June 29, 1943. S. C. PRITCHARD Re. 22,339

HAIR DRYING MACHINE

Original Filed Aug. 23, 1940 2 Sheets-Sheet 1

INVENTOR
S.C. PRITCHARD

BY
Blair & Kilcoyne
ATTORNEYS

June 29, 1943. S. C. PRITCHARD Re. 22,339

HAIR DRYING MACHINE

Original Filed Aug. 23, 1940 2 Sheets-Sheet 2

INVENTOR
S. C. PRITCHARD
BY Blair & Kloomz
ATTORNEYS

Reissued June 29, 1943

Re. 22,339

UNITED STATES PATENT OFFICE 22,339

HAIR DRYING MACHINE

Sydney Charles Pritchard, London, England

Original No. 2,281,993, dated May 5, 1942, Serial No. 353,972, August 23, 1940. Application for reissue April 24, 1943, Serial No. 484,436. In Great Britain September 9, 1938

10 Claims. (Cl. 34—48)

The present invention relates to hair drying machines of the character used in the dressing of ladies' hair, having a hood which is adapted to be placed over the head so as to enclose the hair and provided with an electrically driven fan for circulating air within the hood and with an electric heater for heating the air during its circulation. Among the objects of the invention are to provide means enabling the application to dryer construction of new constructional materials to be successfully and advantageously achieved; to afford a greater degree of comfort to persons under treatment than was possible with known dryers; and generally to provide improved hood dryers that are more effective in use than those heretofore.

These and other objects of the invention are attained by the novel structures, combinations and features hereinafter described and more particularly pointed out in the appended claims, and in order further to explain the invention, reference is directed to the drawings appended hereto in which Fig. 1 is a part sectional view of one embodiment of the dryer;

Figure 2:
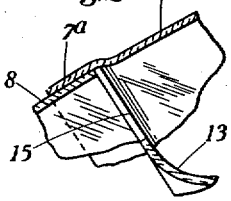
Fig. 2 is a section showing a detail modification of the connection between two parts of the hood.

Hood dryers as now practically universally in use by hairdressers have a hood which is generally of approximate parabolic contour and has the air circulating fan together with its electric driving motor and the electric heater housed within the hood remote from the open end thereof which is adapted to be placed over and around a person's head, the rim of the open end of the hood being contoured so as to pass across the person's forehead and sweep downwardly and rearwardly at either side thereof around the temples and ears to the nape of the neck. Such hoods have most generally been made entirely of metal although more recently Bakelite has also been used for their construction. Now, it has been extensively found from practical experience in the employment of such dryers that the hood, being opaque and passing over a lady's forehead and temples, engenders in her a "boxed-in" feeling notwithstanding that the hood is not designed to contact or rest on the head. This feeling assisted by the noise and heat that has been associated with such dryers has undoubtedly resulted in many cases in marked discomfort being experienced by ladies having their hair dried with these machines and in a reluctance to have a hood dryer used upon their heads. Another defect of the opaque hood is that the operator of the machine is unable to readily inspect the hair from time to time during the process of drying. All-metal hoods have the further defect of becoming appreciably hot to the touch even at the part around the person's head, and thereby engender further discomfort unless the rim be covered with heat insulating material, such as a rubber moulding.

With a view to overcoming these defects in hood dryers, I make use of transparent cellulosic or synthetic resin material in the construction of the hood since these materials, in addition to their high transparency, possess qualities which render them peculiarly suitable for this purpose, being non-inflammable and non-conductors of heat and electricity as well as having the important advantages over glass of being unbreakable and lighter in weight. However, all such transparent cellulosic and synthetic resin materials that are available at the present time are thermoplastics, and in consequence are easily distorted by heat. This is particularly so with transparent cellulosic materials, such as cellulose acetate, known commercially as "Cellastoid," "Novellox" and "Rhodoid" as they begin to become plastic at about 150° F., while the available transparent synthetic resin materials, such as known commercially as "Diakon" and "Perspex," become plastic at about 120° C. I have found that owing to the heat that is generated within the hood when the heater of the dryer is in operation, the thermoplastic nature of such transparent materials precludes merely substituting such material for the metal or Bakelite hitherto used and making the entire hood of the transparent plastic.

In order to overcome this defect in these otherwise eminently suitable thermoplastics, I therefore make use of a two-part construction for the hood. In carrying the invention into practice, I provide an open-ended casing or upper hood portion 1 (Fig. 1) that houses an electric motor 2, the shaft of which extends through a partition 3 and carries a fan 4 at its extremity. I prefer to employ an air cooled motor 2 of the induction type and to cushion it between rubber mountings, so as by this combination to eliminate motor noise and vibration. The partition 3, which is secured in any convenient manner to the inner wall of the casing 1, carries an electric heater 5 which is located behind the fan 4, between the latter and the motor 2. Conforming to current practice in hood-dryers, provision is made by suitable switch means (not shown) for enabling the heater to give a number of graduations (usually three) of heat. The casing 1 that houses the motor 2, fan 4 and heater 5 I make of a heat-resting material that will not distort under the influence of the heat generated by the heater 5 when the latter is working. I also make the casing 1 non-transparent so as to conceal the mechanism of the dryer contained therein, and to prevent any discoloration of the inside of the casing due to scorching from being visible. As a convenient heat-resisting and opaque material for the casing 1, metal may be used although instead of this a suitable form of papier-mâché or Bakelite or some other infusible opaque synthetic resin material of the thermo-setting type may be employed.

Secured to the casing 1 and coaxially therewith is the lower portion of the hood, indicated generally by 6, which is designed to receive the head of a person. This portion 6 I make as a separate structure from the casing 1 and of a transparent cellulosic or synthetic resin material before mentioned. As shown more fully in Fig. 1, the lower portion 6 of the embodiment of dryer being described comprises a rearward or upper part 7, by the upper rim of which the transparent portion 6 is secured to the open end of the casing 1, a forward or lower part 8 having an inwardly upturned rim 9 and designed to overlie the forehead, temples and nape of the neck of a person, and a bowl-shaped annular partition 10 arranged within the part 7 so as to leave an annular space between the partition and the inner surface of the part 7, the partition 10 together with the part 8 defining a chamber for receiving a person's head. All these parts 7, 8 and 10 are made of the transparent cellulosic or synthetic resin material.

Figure 8:
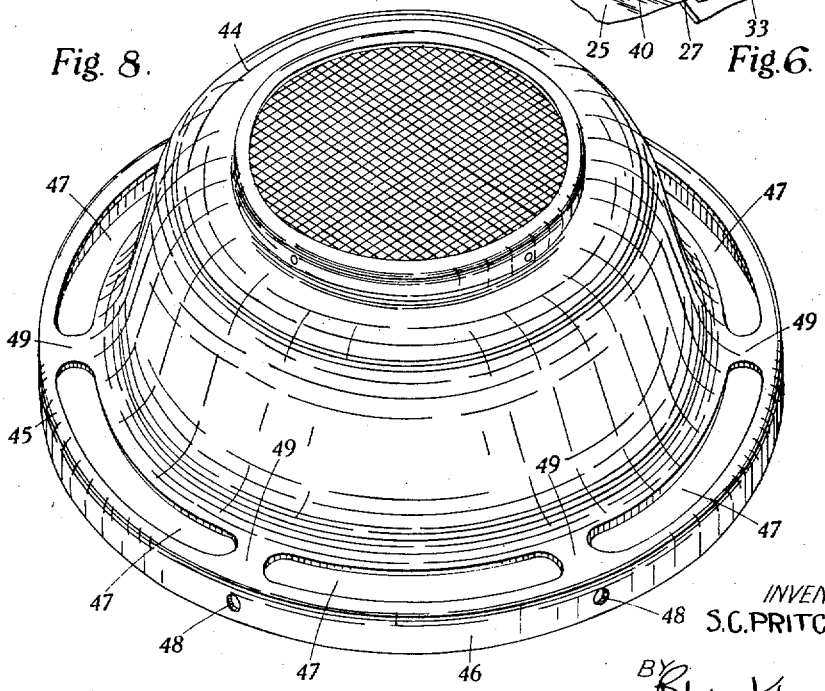
Fig. 8 shows a detail of Fig. 7.

The part 7 may be made from a sheet of cellulosic material bent to the desired annular shape, the two ends being secured together by a transparent cement. The front part 8 may also be made from sheet cellulosic material by pressing the material in moulds after it has been heated to make it plastic, whereby the material is moulded to the desired shape. The annular partition 10, which may be similarly moulded from sheet cellulosic material, comprises an inverted bowl having a central opening 14 and a rim formed with integral radial arms 15. The parts 7, 8 and 10 are assembled and secured together, with the outer ends of the supporting arms 15 of the part 10 located between the parts 7 and 8. I may accomplish this in the manner shown more fully in Fig. 1, by the use of a narrow joining band 11 made of the transparent plastic and having an inwardly projecting rib 12 which butts between the adjacent rims of the parts 7 and 8, the parts of the band 11 on either side of the rib 12 lapping over said rims. The outer ends of the arms 15 engage in slots in the edge of the part 7 and are secured between the edges of those slots and the rib 12. A transparent cement is used to secure the rims of the parts 7 and 8 to the band 11 and to secure the ends of the arms 15 in place. The band 11 may be dispensed with by lapping together the rims of the parts 7 and 8, one rim being stepped as at 7a (Fig. 2) so as to enable the ends of the radial arms 15 to be secured between the two parts 7 and 8. By the assembly, a series of segmental openings 13 as shown in Fig. 8 at 47 are formed around the rim of the bowl 13 between said rim and the internal surface of the part 7. The central opening 14 is covered by a gauze 17. Vanes 18 serving to control the air flow are arranged at intervals around the internal surface of the part 8 and in planes parallel to the axis of the hood. These vanes are also made of transparent cellulosic material and secured to the inner surface of the part 8 by means of a transparent cement for example.

In the operation of the dryer, the fan 4 draws air inwardly through the central opening 14 of the annular partition 10, causes it to pass over the electric heater 5 and then projects it forwardly through the annular space between the bowl 13 and the internal surface of the part 7 and into the front part 8 by way of the segmental openings 16. The air stream, flowing along the internal surface of the part 8, is then re-directed inwardly by the upturned rim 9 so as to pass into the bowl 13 over the hair of a person's head disposed within part 8 and bowl 13, and thence through the opening 14 back to the fan.

While I have particularly described the transparent portion of the hood as being made from sheet cellulosic material, I do not wish to limit myself in this respect since transparent synthetic resin materials may be used instead and the transparent portion of the hood may be moulded from moulding powders of such materials in manner well-known in the plastic art. Practice of the invention has so far shown, however, that for a transparent hood portion of the character shown in Fig. 1, that is to say, where the partition 10 and its surrounding hood part 7 are included in the transparent portion, the use of sheet cellulosic material is preferred to transparent synthetic resin, for reasons connected with production.

By a two-part construction of the hood from different materials as specified, I obtain a dryer having outstanding technical and practical advantages. The prejudice against hood dryers due to the "boxed-in" feeling that they have hitherto engendered is eliminated by the transparency of the part receiving the head, the transparent cellulosic or synthetic resin material of which that part is made is unbreakable and non-inflammable and a non-conductor of heat and electricity, so that it is quite safe to the user both electrically and in other respects and is never hot to the touch, whilst the use of an opaque heat-resisting material for the casing or hood portion 1 enclosing the mechanism of the dryer satisfies the requirement for concealment of the mechanism and also solves the thermal problems associated with reduction to practice of the conception of a transparent hood dryer using transparent plastics as constructional materials.

Figure 1:
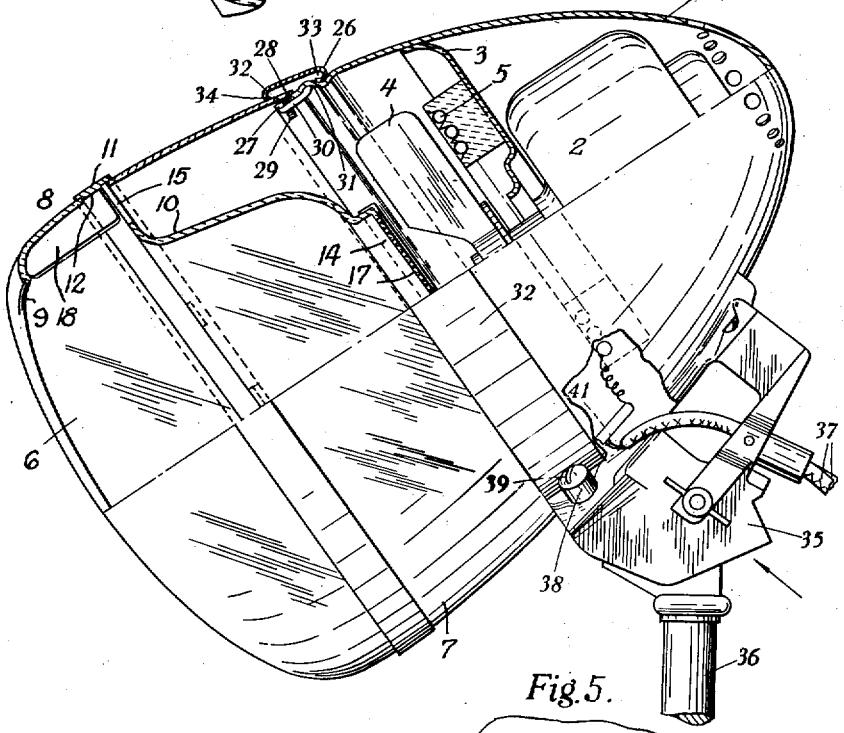

Although the novel two-part construction described broadly offers a solution of the problem just mentioned, I have found in practice with two-part hoods as before described which use transparent thermoplastics for the whole lower portion 6 as shown in Fig. 1, that sometimes shrinkage thereof occurs under influence of the heat generated within the hood by the heater, which shrinkage has become apparent particularly around the rim of the part 7 between the points of attachment to the casing 1. This shrinkage is undoubtedly due in this particular construction to the proximity of this rim to the heater. Additionally, with a metallic casing 1 and also metallic fixing elements securing the casing and transparent part together, these metallic parts which are close to or are in engagement with the rim of the transparent part become quite hot during operation of the dryer. This defect has been particularly observed with such constructions made from sheet cellulosic material.

Figure 3:
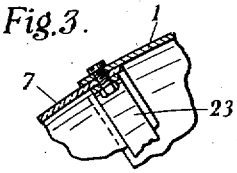
Fig. 3 illustrates an additional feature applicable to the dryer of Fig. 1.

I may remedy this defect by the provision of means for safeguarding the rim in question against such shrinkage, and preferably for this purpose this rim is provided internally with a lining or like reinforcement made of heat-resisting material that will not distort under the influence of the heat generated by the heater of the dryer. In carrying this feature into practice, I may provide an annulus 23 (Fig. 3) of metal or other suitable heat-resisting material supporting the inside of the rim of the part 7 fitted within the open end of the casing 1. This annulus may, as shown, be a band which is separate from the part 7 but which is secured thereto in any convenient manner by bolts, rivets or the like, e. g., by the fixing bolts already before mentioned which secure the transparent and non-transparent portions of the hood together. I do not, however, exclude the use of an annulus in the nature of an insert embedded or otherwise made integral with the inner wall of the part 7 at this place.

Figure 4:
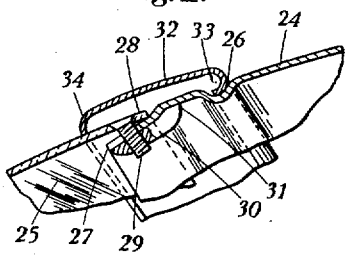
Fig. 4 is an enlarged view of a detail of Fig. 1.

The desired reinforcement may be accomplished in another way, by making use of the rim of the non-transparent portion itself of the hood to provide the reinforcement. In this case, the rim of the transparent portion is fitted over the open end of the non-transparent portion so that the rim of the latter extends inside the cooperating rim of the transparent portion. An embodiment of such an arrangement is illustrated in Fig. 1. As previously described, however, the transparent portion 6 fits over the open end of the casing 1, which is formed with a groove 26 on its outer surface near the rim 27 of its open end. If the casing 24 is of metal this groove may be formed by spinning. As shown more clearly in Fig. 4, the rim 27 is stepped and inwardly tapered sufficiently to allow the upper rim 28 of the transparent portion 25 to be fitted over it. By reason of the inward taper of the rim 27, the rim 28 makes substantially line contact therewith when the casing 24 and transparent part 25 are fitted together. A packing ring (not shown) of cork or similar material having poor thermal conductivity may, if desired, be interposed between the contacting rims 27 and 28. These rims are secured together by preferably countersunk bolts 29 which are passed through holes in the rim 28 at intervals (say, four) around its periphery and are screw-threaded into dogs 30 having bent or hook-shaped ends which engage in a groove 31 on the inside surface of the casing 24. The bolts 29 may pass clear across the edge of the casing 24 or the latter may be recessed at the appropriate places to permit free passage of these bolts.

Figure 5:
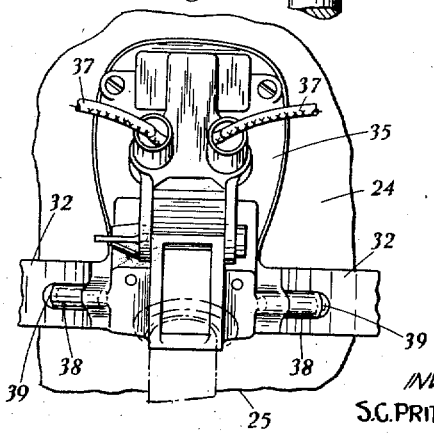
Fig. 5 is a fragmentary view looking in the direction of the arrow in Fig. 1.

Encircling the hood and covering the joint between the casing 24 and transparent part 25 is a metal band 32 having an inwardly directed flange 33 at its upper edge which engages in the outside groove 26 on the casing 24. The lower edge of the band 32 may also have an inwardly directed flange 34 to grip the transparent portion 25 like a claw when the band is tightened. The flange 34 may engage a groove (such as indicated at 40 in Fig. 9) in the outside surface of the portion 25. The ends of the band are tightened together in any suitable manner and in one convenient arrangement as shown, are secured to the bracket 35 provided at the back of the hood by means of which the hood is pivotally mounted on its supporting stand 36. This bracket is usually made hollow and also accommodates the electric leads 37 to the hood. As shown more clearly in Fig. 5, the bracket 35 is located between the ends of the band 32 which are provided with apertured lugs 38 which receive screws or bolts 39 screwing into the bracket. Alternatively, the ends of the band might project into the hollow bracket and be tightened, for example, by means of a screw which passes through a threaded aperture in the bracket and engages suitable lugs at the ends of the band.

By clamping the rim 28 of the transparent portion 25 of the hood between the rim 27 of the non-transparent casing 24 and an encircling band 32 as described, shrinkage of the transparent material at this place is prevented.

As a further safeguard against possible shrinkage of the rim of the transparent portion under excessive heat arising, for example, in the event of failure of the motor while the heater is on, a temperature-responsive circuit breaker may be provided within the hood and connected in the electric supply circuit of the heater so that in the event of the temperature within the hood in the vicinity of the connection between the transparent part and the casing exceeding the predetermined critical value above which the material of the transparent part is liable to begin to soften and shrink, the circuit breaker is operated to interrupt the heater circuit. The circuit breaker may conveniently take the form of a fuse element 41 consisting, for instance, of a length of fusible wire, such as lead wire, which is located at a suitable spot in the hood for the purpose in view, such as in close proximity to the rim 28 of the transparent portion although the fuse may even be placed on or adjacent the porcelain or other base that carries the heater element, since whilst the motor is running the fan prevents the heater attaining a sufficiently high temperature to melt the fuse.

Figure 6:
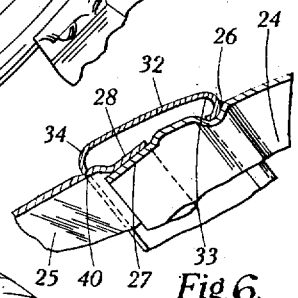
Fig. 6 is a view similar to Fig. 4 showing a modification in the detail of Fig. 4.

Instead of stepping and inwardly tapering only the rim 27 so as to get substantial line contact with the rim 28, both rims may be stepped and complementarily tapered so that they lie parallel at the overlap, as shown in Fig. 6, in order to enable the rim 28 to be fitted over the rim 27. In this case, the contacting parallel rims may be directly bolted together at peripheral intervals. In Fig. 6, however, a modified way of securing the upper and lower portions of the hood together is illustrated. In this case, there is provided a substantial overlap between the rim 28 and the rim 27, the rims being made parallel at the overlap in order to enable the transparent portion to be fitted on to the casing 24. The latter is, as described in conjunction with Fig. 1, provided with an outside groove 27 and a groove 40 is also provided on the outer surface of the transparent part 25 close to its rim 28, the two parts being secured together by the metal band 32 having upper and lower inwardly directed flanges 33 and 34 which engage respectively in the grooves 26 and 40. The groove 40 is located within the overlap zone of the rims 27 and 28 so that the rim 27 of the casing 24 provides a backing-up support behind the groove where the rim 28 is gripped by the band 32. With this embodiment the two parts are secured together entirely by the rim 32 and additional fixing parts such as the parts 29 employed in the arrangement shown in Fig. 1 may be entirely dispensed with.

Figure 7:
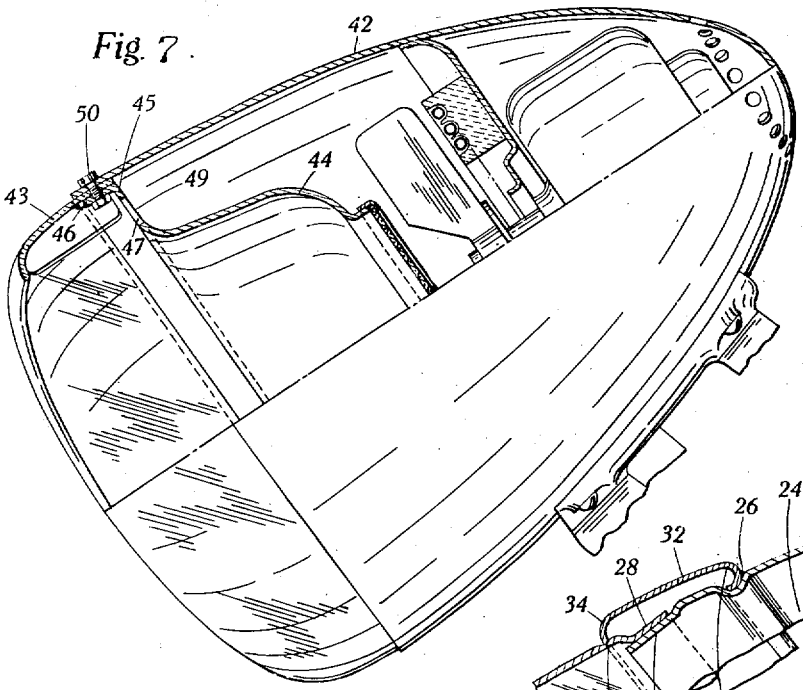
Fig. 7 is a part sectional view of a further modified embodiment.

I now direct attention to the fact that by making use of transparent plastic as constructional material not only for the front part 8 of the hood but also for the internal bowl-shaped partition 10 and likewise its surrounding part 7, complete visibility from outside the hood is afforded to the whole of the head placed within the hood, since the head-receiving chamber is bounded and surrounded by wholly transparent walls. While this form of construction is preferred, I do not wish to be limited in that respect, since it may be sufficient, for elimination of the "boxed-in" feeling previously mentioned, to confine the use of the transparent material merely to the front part of the hood that overlies the forehead, temples and nape of the neck. In other words, I wish it to be clearly understood that the partition 10 (and with it the surrounding part 7) may preferably but not necessarily be made of the transparent material. Thus, a hood construction as shown in Fig. 7 may be employed in which, as compared with the hood of Fig. 1, the metal or other opaque heat-resisting casing 42 housing the motor, heater and fan as before, extends over the zone of the hood represented by the part 7 in Fig. 1, so that only the front part 43 (corresponding to the part 6 of Fig. 1) is made of the transparent material. In this case, the bowl-shaped annular partition 44 (corresponding to part 10 of Fig. 1) is preferably also made of the metal or other opaque heat-resisting material and the upper rim of the transparent part 43 is bolted or otherwise secured between the rim of the casing 42 and the means provided on the partition 44 to support it. Such means may consist of depending lugs spaced around the periphery of the bowl 44, or alternatively as shown more clearly in Fig. 8, the bowl 44 may have a rim 45 provided with a depending annular skirt 46, the rim 45 having a number of elongated segmental slots 47 therein for passage of the air stream and the skirt 46 having bolt holes 48 therein opposite the webs 49 in the rim defined between the slots 47. On assembling the parts of the hood, bolts 50 secure the casing 42, transparent front 43 and partition 44 together, with the upper rim of the front 43 between the rim of the casing 42 and the annular skirt 46. The upper rim of the transparent front 43 being more remote from the heater than is the case with the transparent portion 6 of Fig. 1, such rim is less likely to be affected by the heater, but any possibility of shrinkage under the influence of the heater is safeguarded against by the presence of the heat-resisting skirt 46 which forms a continuous lining or reinforcement for the rim.

In all embodiments of the invention, the transparent portion of the hood may be left colourless or, alternatively, the material may be lightly tinted to any desired colour.

While I have given a detailed description of specific embodiments of dryers according to the invention, many other modifications may be devised, as will be apparent to those skilled in the art, without departing from the spirit of the invention, and I desire therefore to be limited only by the appended claims.

I claim:

1. In a hair drying machine, a hood comprising a non-transparent casing having an open end, an electric fan and an electric heater housed within said casing, a transparent structure having a rim fitting the open end of said casing and having an open bottom adapted to receive the head of a person therethrough, means securing said rim of said structure to the open end of said casing in overlapping relation, said casing being made of a material resistant to the heat generated therewithin by said heater, said structure being made of a transparent thermoplastic that is susceptible to distortion and shrinkage under the influence of such heat, and said securing means including means adapted to protect said rim from heat generated by said heater to prevent distortion and shrinkage of said rim under the influence of such heat.

2. In a hair drying machine, a hood comprising a non-transparent casing having an open end, an electric fan and an electric heater housed within said casing, a transparent structure having a rim fitting inside the open end of said casing and having an open bottom adapted to receive the head of a person therethrough, means securing said rim of said structure to the open end of said casing, said casing being made of a material resistant to the heat generated therewithin by said heater, said structure being made of a transparent thermoplastic that is susceptible to distortion and shrinkage under the influence of such heat, and a reinforcement within said rim and made of a material resistant to the heat generated by said heater for preventing distortion anad shrinkage of said rim under the influence of such heat.

3. In a hair drying machine, a hood structure comprising a non-transparent casing open at its lower end, an electric fan and an electric heater housed in said casing with said heater disposed in the path of the fan's airstream, said casing being made of a material resistant to the heat generated within the casing by said heater when in operation, an open-bottomed transparent annular structure made of a transparent thermoplastic adapted to receive through the open bottom thereof the head of a person and having an upper rim fitting inside the open end of said casing, means securing said rim to said open end, and a radially incompressible heat-resistant support backing-up the inside surface of said rim.

4. In a hair drying machine, a hood structure comprising a non-transparent casing open at its lower end, an electric fan and an electric heater housed in said casing with said heater disposed in the path of the fan's airstream, said casing being made of a material resistant to the heat generated within the casing by said heater when in operation, an open-bottomed transparent annular structure made of a transparent thermoplastic adapted to receive through the open bottom thereof the head of a person and having an upper rim fitting over the open end of said casing to prevent shrinking, and surrounding annular means securing said rim to said open end.

5. A hair drying machine as defined in claim 4, said securing means including a heat-resistant clamping band encircling said rim and in engagement with the outside surfaces of both said transparent structure and said casing.

6. In a hair drying machine, an elongated hood having upper and lower portions open at its bottom end for the reception of the head of a person, an electric fan and an electric heater within said hood and located remote from said open end with said heater disposed in the path of the fan's airstream, an annular partition disposed transversely within the hood between said fan and said open end, said partition being spaced from the inner surface of the hood to afford communication through said space with the interior of said partition for admission of air to said interior, the aperture within said partition affording an outlet for extraction of air from said interior, the upper portion of said hood that encloses said fan and heater being made of a heat-resistant material that will withstand the heat generated by said heater, the lower portion of said hood that is adapted to surround the head of a person being a separate structure from said upper portion and made of a transparent thermoplastic, means securing said upper and lower portions together in lapping relation, and radially incompressible heat-resistant supporting means backing up the inner surface of said lower portion at the joint thereof with said upper portion.

7. In a hair drying machine, a hood structure comprising a non-transparent casing open at its lower end and generally tapering towards its closed upper end, the open end of said casing having a narrow rim inclined inwardly towards the axis of said casing, an electric fan and an electric heater housed in said casing relatively near its closed end, with said heater disposed in the path of the fan's airstream, said casing being made of a material resistant to the heat generated within the casing by said heater when in operation, an open-bottomed transparent annular structure made of a transparent thermoplastic adapted to receive through the open bottom thereof the head of a person and having a general taper from bottom to top conforming with the taper of said casing, said structure being coaxial with said casing and having an upper rim fitting over said rim of said casing to make substantially line contact therewith, said rim of said structure having bolt holes therethrough at peripheral intervals, bolts passing through said holes and carrying hook-ended dogs internally of said structure, the hook ends of said dogs engaging the inside surface of said casing behind said inturned rim thereof, whereby to secure said casing and transparent structure together internally, a clamping band encircling said rim of said structure and covering the joint between said structure and casing and also the external ends of said bolts, and means drawing the ends of said band together.

8. In a hair drying machine as defined in claim 7, a bracket on said casing for mounting the hood on a stand, said bracket being located between the ends of said band, said ends each being bolted to said bracket.

9. A hair drying machine as defined in claim 7 in which said band has inturned edges respectively engaging the outer surfaces of said casing and structure.

10. In a hair drying machine, a hood comprising a non-transparent casing having an open end, an electric fan and an electric heater housed within said casing, a transparent structure having a rim fitting the open end of said casing and having an open bottom adapted to receive the head of a person therethrough, means securing said rim of said structure to the open end of said casing, said casing being made of a material resistant to the heat generated therewithin by said heater, said structure being made of a transparent thermoplastic that is susceptible to distortion and shrinkage under the influence of such heat, and a temperature-responsive circuit breaker within the hood and in circuit with said heater, adapted to interrupt the heater circuit upon the temperature within the hood in the vicinity of said rim of said transparent structure exceeding the predetermined critical value above which the material of said structure is liable to distort and shrink.

SYDNEY CHARLES PRITCHARD.